Dec. 6, 1927. 1,651,389
M. L. HEINEKE
TIRE REMOVING ATTACHMENT FOR TIRE CHANGERS
Filed Oct. 23, 1924 2 Sheets-Sheet 1

Witnesses:
1. Henry Becker
2. C S Noland

Martin L. Heineke
INVENTOR.

BY A.B. McCall
ATTORNEYS.

Dec. 6, 1927.
M. L. HEINEKE
1,651,389
TIRE REMOVING ATTACHMENT FOR TIRE CHANGERS
Filed Oct. 23, 1924   2 Sheets-Sheet 2
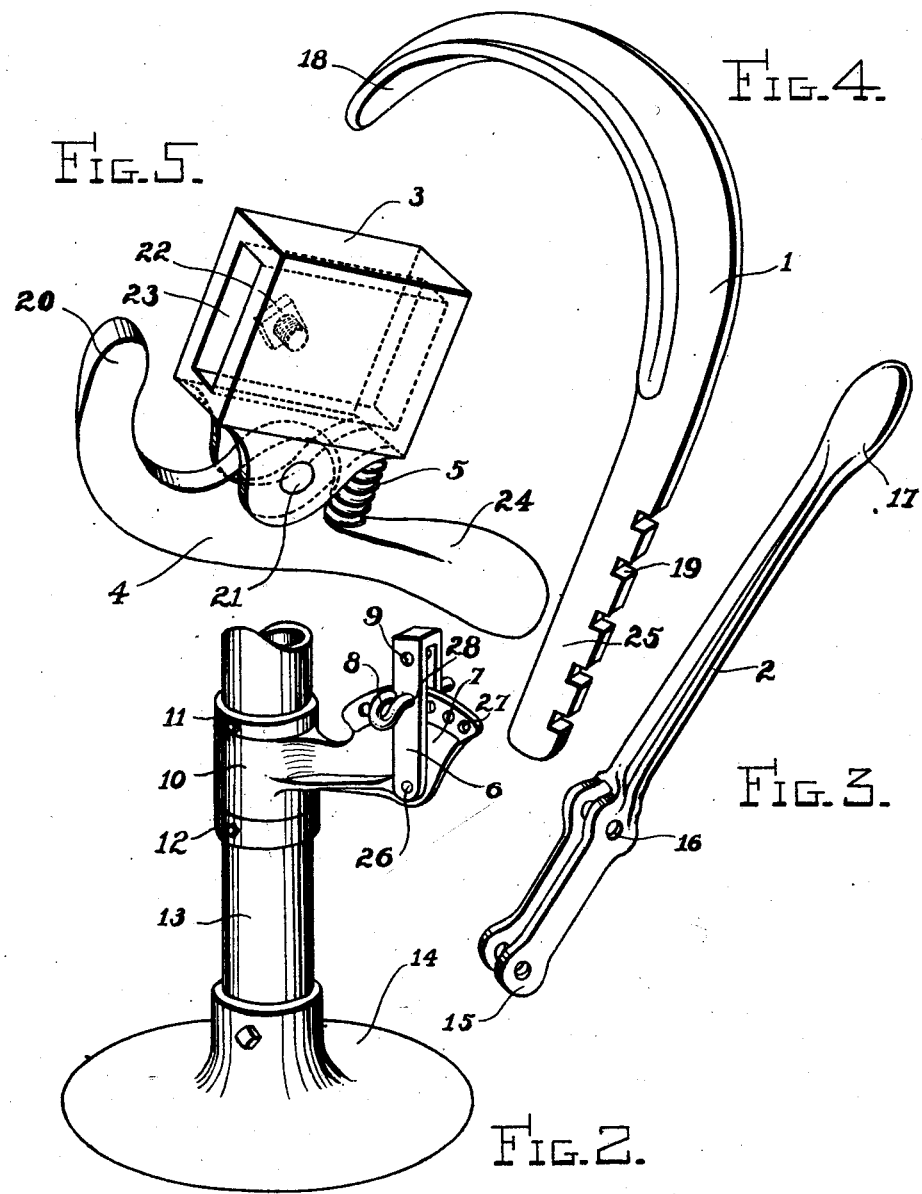

Patented Dec. 6, 1927.

1,651,389

UNITED STATES PATENT OFFICE.

MARTIN L. HEINEKE, OF SPRINGFIELD, ILLINOIS, ASSIGNOR TO THE WEAVER MANUFACTURING COMPANY, OF SPRINGFIELD, ILLINOIS.

TIRE-REMOVING ATTACHMENT FOR TIRE CHANGERS.

Application filed October 23, 1924. Serial No. 745,484.

My invention relates to a class of machines that may be successfully adapted for use as a tire removing attachment for automobile tire changers, an object being in this device to simplify the character of devices for this purpose and thus save time and labor in the manual operation of the same.

My invention embodies improvements in tire removing attachments for automobile tire changers and is adapted to provide a simple economical and durable means by which automobile tires may be quickly and easily removed from the rim normally holding the same while the tire is being held in a position for removal on a tire changing machine and more particularly on a machine of the type illustrated in the drawing herewith.

A particular object of my invention furthermore being to provide a tire removing attachment not only possessing the above mentioned merits but withal possessing certain novel features of construction, combination, and arrangement of parts as will be hereinafter more fully described in the annexed specifications recited in the claim and illustrated in the accompanying drawings in which like reference numerals indicate the structural parts in the several figures.

Referring to the drawings Fig. 1 is a perspective of the tire removing attachment of my invention adapted to be used in conjunction with an automobile tire changer of the general character and type on which the tire removing attachment is shown to be mounted by means of a rotatable bracket support which forms an important element of detail in the construction of the device of my invention.

It will be noted in this figure that the tire removing attachment of my invention is shown in position ready for a tire removing operation and it will also be noted in the same figure that when the tire removing attachment is not in use it may be conveniently folded down to a neat position about the base of the automobile tire changer in the manner shown in the dotted lines representing the same.

Fig. 2 is a perspective showing in larger detail the manner in which the rotatable collar supporting bracket, forming a part of the detail of my invention, is mounted between upper and lower retaining collars detachably secured about the leg of the automobile tire changer with which in the preferred arrangement the device is adapted to operate.

Fig. 3 is a perspective of the lever handle forming a part of the tire removing attachment; it being a handle so mounted and adapted to operate normally on the principle of a second class lever.

Fig. 4 is a perspective of the tire removing hook of my invention provided with ratchet notches.

Fig. 5 is a perspective of the pivot mounted ratchet sleeve normally adapted to slidably support the extension arm of the tire removing hook.

Figure 1:
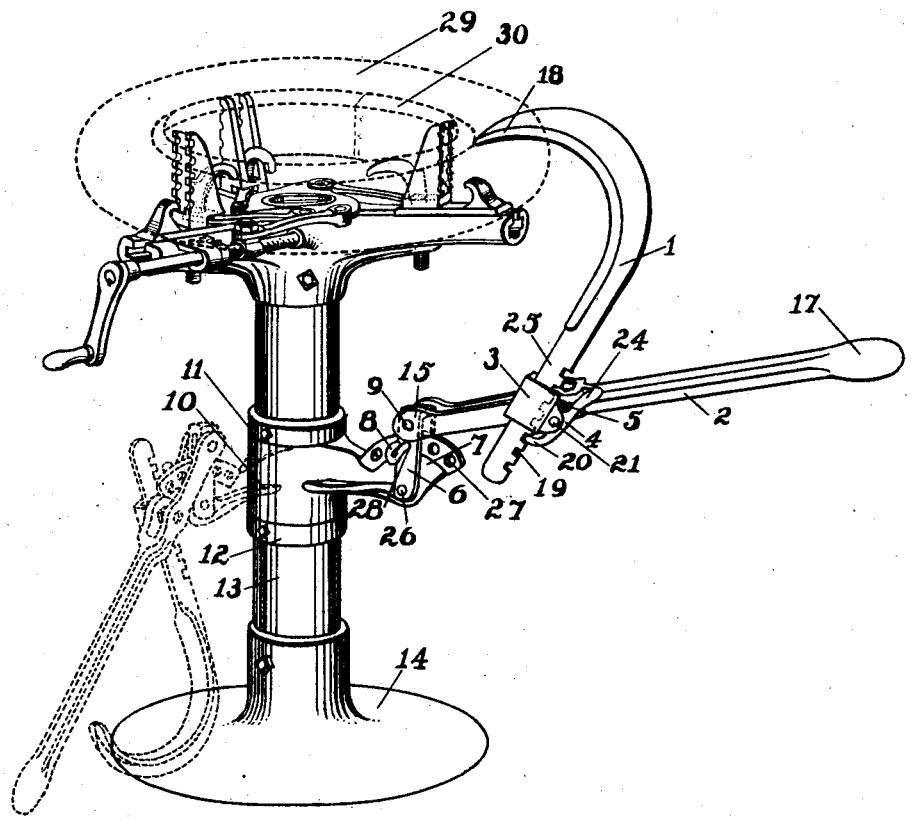

The preferred embodiment of my invention and the desired methods of producing the intended results therewith will now be pointed out and reference made to the several numerals in the respective figures which in detail will indicate certain co-operating details of structure and operation in the device of my invention.

In detail my device comprises a hook —1— formed to a suitable shape for the safe removal of tires and terminating in a point —18— made suitably smooth for contact with tires when it is desired to exert pressure on the tires in normally removing them from the rims supporting the same. The tire removing hook is provided with an integral extension arm —25— provided with ratchet notches —19—.

Second class lever handle —2— is adapted to be pivotally mounted on the upper end of a supporting arm —6— also pivotally mounted by a pin —8— in holes —15— and —9— in the handle and supporting arm respectively; said supporting arm for the handle is pivotally mounted at —26— on a vertical arched sector bracket —7— an integral part of rotatable collar bracket —10— for the rotatable support of the device of my invention. The pivoted supporting yoke arm —6— is adjusted in a vertical plane astride arched sector —7— and substantially held in the desired position of adjustment by pin —8— inserted in holes —28— of the supporting arm —6— and through the desired retaining hole in the sector, one of which is indicated at —27—.

It will be noted that the rotatable collar supporting bracket —10— is substantially held by means of adjustable collars —11— and —12— on the standard —13— as the needs may require.

After handle —2— is pivotally mounted as described on the supporting arm —6— ratchet sleeve —3— with its co-operating ratchet lever —4— and ratchet spring —5— is mounted pivotally on handle —2— through hole —16— by means of bolt —22— after which the hook —25— is slidably inserted through rectangular opening —23— in sleeve —3— whereupon ratchet dog —20— of ratchet —4— automatically snaps into engagement with ratchet notches —19— of the tire removing hook because of the action of spring —5—.

When it is desired to make adjustment in the reaching range of the hook a little pressure on ratchet lever —4— against spring —5— at handle —24— will release the ratchet dog —20— from engagement with notches —19— so that optional adjustment may be made. Ratchet dog pivots on sleeve —3— at —21—. The base plate of the tire changer on which the device of my invention is adapted to be used is indicated at —14—.

The operation of this device is simple and easy to understand and will be appreciated by those skilled in the art.

Assuming that pneumatic tire —29— has been placed in suitable position for removal from its supporting rim —30— the operator first places the tire removing hook —1— in suitable position on top of the tire near the outer edge of the supporting rim and then exerts a downward pressure on handle lever —2— with the pressure applied at hand grip —17— thus causing the point —18— of the hook to remove the clincher from the rim after the rim has been suitably prepared for such removal by the methods provided in the normal operation of tire changers of the character illustrated in Figure —1— for which Letters Patent have been previously applied.

After releasing the tire clincher in this manner from its rim in one place the tire removing attachment may then be rotatably moved from place to place about the periphery of the tire where from step to step a downward pressure is exerted against the tire in all the necessary positions about the periphery of the tire to effect a successful removal of the same from the supporting rim thereof.

In this connection particular attention is called to the fact that the tire removing attachment is adapted to be optionally rotated about the periphery of the tire through the rotatable action of collar supporting bracket —10— mounted on the leg of the tire changer; this being a particular advantage in removing a tire due to fact that it enables the operator to quite easily hold the advantages gained in the successive steps in the tire removing operation.

It will be noted that this device is adapted to tires of various sizes and to those skilled in the art it will be evident that certain minor changes may suggest themselves and such changes may be suitably made without departing from the spirit and scope of this invention or sacrificing any of its intended merits.

Having thus described the nature of my invention I claim:

In a tire removing attachment for a tire changer, the combination with a sleeve for rotatable and adjustable mounting on the leg of the changer and bearing a bracket and arched sector, of a yoke pivoted to the bracket and adjustable in a vertical plane by a pin passing through a hole in the yoke and holes in the sector, a lever pivoted to the yoke, a sleeve pivoted on the lever, a spring pressed pawl pivoted to the sleeve and a hook having a notched shank adjustably engaged by the pawl and passing through the sleeve.

In witness whereof, I hereunto set my hand this 15th day of October, A. D. 1924.

MARTIN L. HEINEKE.